US005275206A

United States Patent [19]

Acker

[11] Patent Number: 5,275,206

[45] Date of Patent: Jan. 4, 1994

[54] VALVE SYSTEM FOR BEVERAGE FILLING MACHINES

[75] Inventor: Richard C. Acker, Chagrin Falls, Ohio

[73] Assignee: Teledyne Industries, Inc., Cleveland, Ohio

[21] Appl. No.: 853,114

[22] Filed: Mar. 18, 1992

[51] Int. Cl.[5] ........................ F16K 17/14; F16K 17/40

[52] U.S. Cl. ................................ 137/625.46; 141/39; 141/47; 141/57; 141/311 A; 251/175

[58] Field of Search ........................ 141/39, 40, 44, 46, 141/47, 50, 51, 54, 56, 57, 311; 251/283, 160, 175; 137/250, 625.31, 625.46, 628, 629, 625.17, 625.42, 625.47, 630, 630.13

[56] References Cited

U.S. PATENT DOCUMENTS

| | | | |
|---|---|---|---|
| 2,451,575 | 10/1948 | Paxton | 137/625.42 |
| 2,912,011 | 11/1959 | Burg | 137/625.31 |
| 2,990,853 | 7/1961 | Sharp | 137/625.42 |
| 3,460,589 | 8/1969 | Justis | 141/39 |
| 3,596,680 | 8/1971 | Adams | 137/625.42 |
| 4,976,295 | 12/1990 | Clüsserath | 141/47 |
| 5,016,684 | 5/1991 | Clüsserath | 141/39 |

*Primary Examiner*—Henry J. Recla
*Assistant Examiner*—Steven O. Douglas
*Attorney, Agent, or Firm*—Pearne, Gordon, McCoy & Granger

[57] ABSTRACT

A rotary face valve for beverage filling machines provides a housing assembly defining a closed chamber. The stationary valving surface is provided open to the chamber, and a valve rotor is journaled in the chamber in engagement with the stationary valve surface. The chamber is pressurized to a pressure closely approaching the pressure of the beverage being valved so that a low differential pressure exists between the chamber and the port through which the beverage flows. This minimizes the tendency to encounter leakage. The rotor is supported by a shaft which is journaled in spaced bearings so that eccentric force applied to the operating shaft is absorbed by the bearings and is not transmitted to the rotor. Further, the rotor is connected to the operating shaft with sufficient freedom to ensure that the rotor properly engages the valve surface in a uniform manner. A drain is provided for the rotor chamber so that any leakage which might occur into the chamber can be drained from the valve without contaminating the adjacent portions of the machine.

4 Claims, 4 Drawing Sheets

VALVE SYSTEM FOR BEVERAGE FILLING MACHINES

BACKGROUND OF THE INVENTION

This invention relates generally to systems for filling carbonated beverage containers, and more particularly, to a novel and improved valve for such machines.

PRIOR ART

Beverage containers, such as beer cans and bottles, are often automatically filled in a carousel-type filling machine. Such machines sequentially transport the containers around a circular path between an inlet or supply conveyor and an exit or discharge conveyor. Some beverages, such as beer, are carbonated prior to the container filling operations and must be held at a pressure high enough to prevent loss of the carbonation at the temperature at which the beverage supply is maintained.

Typically, the carousel is provided with a large number of rotary face valves which move with the associated container around the circular path and are operated by adjacent cams through a predetermined cycle of operations to fill the container as it moves from the carousel supply to the carousel discharge.

In order to obtain high production rates, the carousels provide a large number of valves and filling stations around its periphery so that high production rates can be obtained with relatively low rates of rotation. For example, a carousel filler having 100 filling stations operating at 15 RPM can fill 1,500 containers per minute.

In some filler machines, the rotary face valves have a body and a rotor formed with passages in the valve face which are interconnected in a desired manner as the rotor is progressively moved through a predetermined number of positions by engagement between arms formed on the rotor and cams mounted adjacent to the path of valve movement. In such valves, a disc of Teflon has been mounted on the valve face of the body to provide dynamic sealing engagement with the rotor.

Such valves tend to function and seal well only at relatively low pressures, in the order of 20-25 PSI. Since the pressure required to prevent loss of carbonation is a function of temperature, and in the case of beer far exceeds 25 PSI at room temperatures, it has been the practice to chill the beer supply to the filler so that the carbonation is not lost at a pressure of about 20-25 PSI. This has required expensive chilling equipment and resulted in substantial expense to maintain and operate the chilling equipment.

Further, after filling and sealing, the beer is usually pasteurized with heat. Heating the chilled beer requires more equipment and uses more energy than would be required if the beer were initially at room temperature.

Another problem is encountered with existing rotary face valves. The entire system must be flushed and cleaned with hot cleaning solution from time-to-time. In practice, the Teflon disc used in the past in the face valves tended to degrade when exposed to cleaning temperatures causing leakage.

Further, in the existing valve, the rotor has been integrally formed with the arms which engage the cams to shift the rotor from one position to another. Therefore, the eccentric actuating forces applied to the rotor by the cams to produce the indexing movement tended to lift, or cant, the rotor. These forces, in themselves, tended to produce leakage. Consequently, in the past, it has been necessary to apply excessive forces to the valve face to prevent these eccentrically applied forces from producing leakage.

Still further, in such prior valves, any leakage which occurred escaped to the adjacent portions of the machine and resulted in problems in maintaining cleanliness within the machine itself.

Further, because it was necessary to apply considerable force between the rotor and the mating Teflon disc, in order to maintain proper sealing, the problem of wear has been accentuated.

SUMMARY OF THE INVENTION

The present invention provides a novel and improved rotary valve capable of operating at pressures sufficient to maintain carbonation of a beverage, such as beer, even at room temperatures. Such pressure may, for example, be in the order of 80 PSI. Further, such valve is capable of withstanding the relatively high temperatures encountered during the system cleaning operation.

The valve is structured so that the differential pressure across the sealing surface is low. This eliminates the need for excessively high surface contact pressures between the valve rotor and the non-metallic sealing disc. Further, the valve shaft carrying the arms which engage the cams as the valve is actuated from one position to the next, is journaled in substantially spaced bearings. These bearings are sized and spaced so as to fully absorb any eccentric loads applied to the shaft by the operating cams. Further, the shaft is connected to the valve rotor with sufficient freedom so that the valve rotor is free to properly seat itself against the mating non-metallic valve face. Further, with the present invention, a structure is provided in which any leakage which might occur is confined to a drain system and cannot reach the environment or adjacent portions of the machine so as to provide a problem in cleanliness.

Still further, in accordance with the present invention, all of the metallic elements are positioned and supported within non-metallic materials which have self-lubricating qualities. Therefore, lubricants are not required to prevent wear. Consequently, lubricant contamination is completely avoided. Further, the nonmetallic materials selected are substantially immune to damage or warpage resulting from the relatively high temperatures required during cleaning operations. Still further, excessive sealing forces are not required, so wear is reduced, with resulting saving in maintenance costs.

In the illustrated embodiment of a valve, in accordance with the present invention, the valve body is provided with connections which are compatible with prior art installations. Therefore, the present valve can be substituted as a replacement valve for existing prior art valves without any substantial plumbing modification.

Further, the functioning elements of the valve are contained within a bonnet or housing which is pressurized in use to minimize the differential pressure across the valve face. Since the differential pressure which must be sealed at the valve face during the valving operation is small, relatively low contact pressures are required between the rotor and the non-rotating valve face. Further, since the housing is pressurized to maintain a substantially constant pressure differential, regardless of the operating pressure of the system, the sealing force applied along the valve face can be maintained substantially constant, even when the pressures of the beverage supplied to the valve are substantially changed.

Still further, the illustrated embodiment provides high rate springs to bias the sealing surfaces into engagement in combination with adjustment means for adjusting the sealing force. Relatively small movements are, therefore, all that is required to obtain the optimum pressure along the sealing surfaces.

Further, in the illustrated embodiment, any leakage which might occur for any reason is fully confined within the housing and is drained from the housing to a closed system.

In operation, the valves initially move to a blow-out position in which the passages in the system are blown out to remove any beverage which might have entered the passage during the preceding filling operation. From the blow-out position, the valve moves to a counterpressure position wherein a compatible gas, such as carbon dioxide, under pressure is introduced into the associated empty container. In this position, the machine establishes the presence of an empty container in the associated fill position and also establishes that a proper seal therewith exists. The valve is then moved to a fill position in which the beverage flows from the supply into the container while the valve maintains the container and the supply at equal gas pressure. Therefore, the beverage flows by gravity from the supply and fills the container. The valve then moves to a vent position, and the cycle is repeated.

The valve is provided with arms which engage cams as the valve moves around the fill path. These arms are supported by a bearing system operable to absorb eccentric loads applied to the arms by the operating cams.

These and other aspects of this invention are illustrated in the accompanying drawings and are more fully described in the following specification.

DETAILED DESCRIPTION OF THE DRAWINGS

Figure 1:
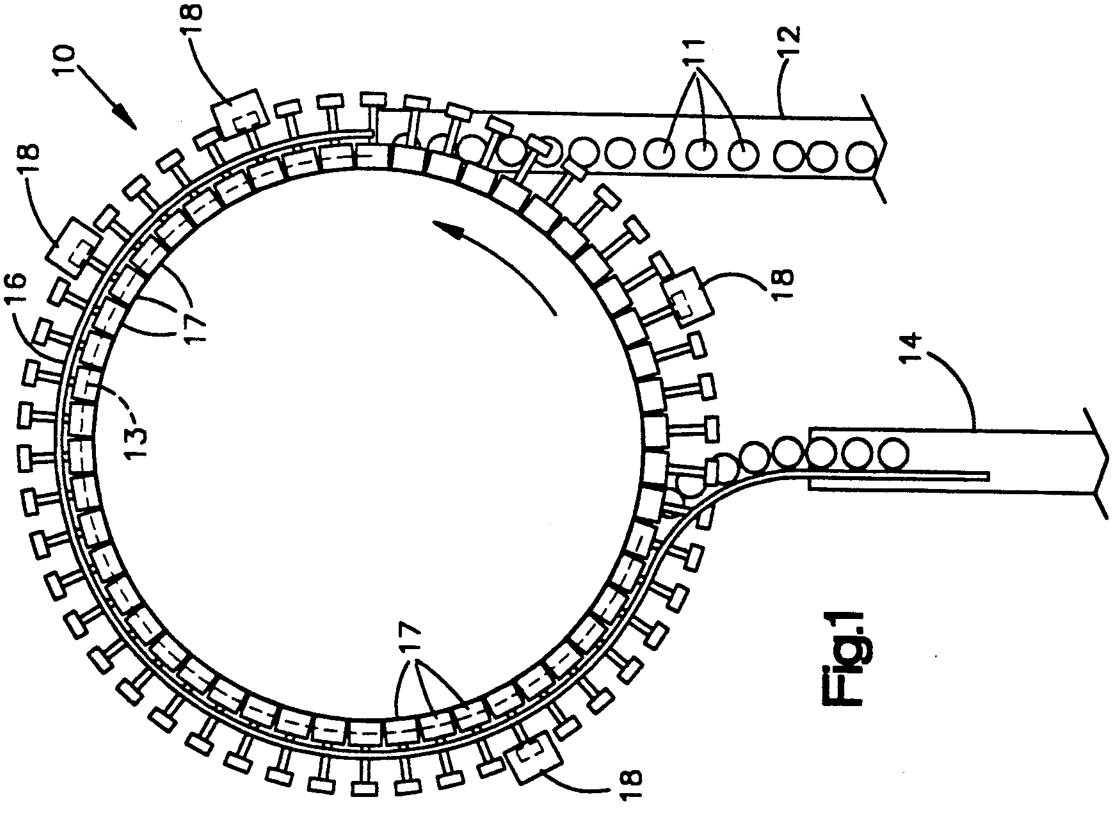
FIG. 1 schematically illustrates a typical carousel-type filling machine with valves in accordance with the present invention mounted thereon.

FIG. 1 schematically illustrates a typical carousel-type filling machine 10. In such machine, the containers 11 are delivered to the machine by a delivery or supply conveyor 12. Containers then move along a circular path 13 where the various filling operations are performed. After filling, the containers 11 are discharged from the machine along a discharge conveyor 14. The machine provides a carousel portion 16 which supports the containers as the containers move from the delivery conveyor to the discharge conveyor. A plurality of valves 17, in accordance with this invention, are mounted on the carousel portion 16. The valves move along the same circular path as the containers 11 and operate to perform the filling of the associated container.

If, for example, a machine is operable to fill one-hundred containers during each revolution of the carousel portion, the carousel portion is provided with one-hundred fill stations, each of which receives a separate container as the carousel rotates through one complete revolution. Such carousel portion also provides one-hundred valves 17 with one associated with each fill station. Each valve is connected to a nozzle through which the beverage flows into the associated container during the movement around the circular path 13. Cams 18 are located adjacent to the circular path 13 to engage cam arms provided by each of the valves and cause each of the valves to sequentially move through a predetermined sequence of operations during each revolution of the carousel 16.

Figure 2:
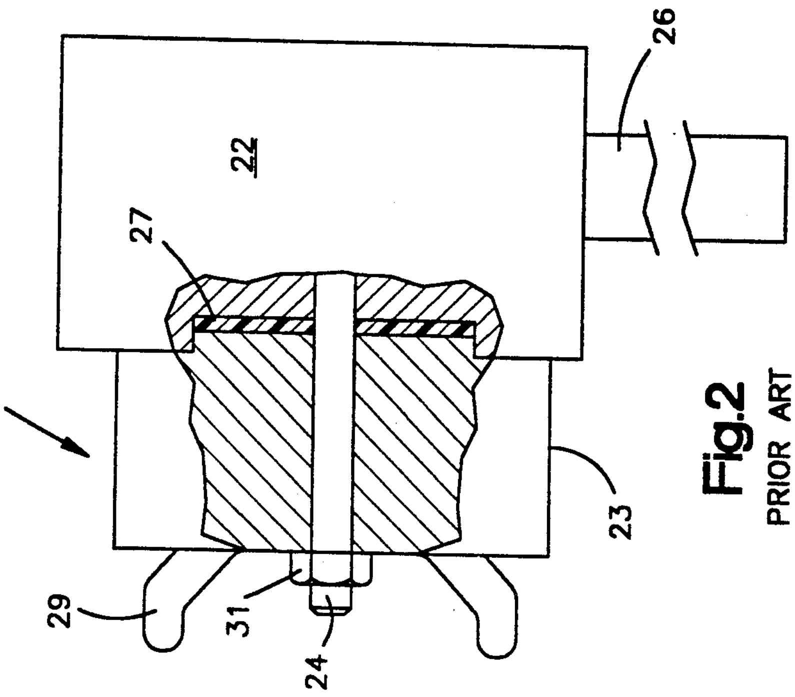
Fig.2 PRIOR ART
FIG. 2 is a fragmentary side elevation, partially in section, illustrating a prior art rotary face valve which has been used on carousel-type filling machines of the type illustrated in FIG. 1.

FIG. 2 illustrates a prior art valve which has been used in carousel-type beverage fillers. The present invention provides a replacement valve with the valve illustrated in FIG. 2 which can be installed with a minimum amount of machine modification. This prior art valve 21 is a rotary face valve having a body 22 and a rotor 23 rotatable relative to the body 22 about a pivot shaft 24. The body 22 of such valve is connected by pressure lines (not illustrated) to the machine proper. One line connects the valve body to a source of beverage. A separate line connects the body to the zone within the beverage supply container above the level of the beverage. A third separate line connects the body to a source of a compatible gas, such as carbon dioxide. The body is also provided with a nozzle schematically illustrated at 26 through which the beverage enters the container being filled.

Positioned within the body 23 is a Teflon disc 27 which provides the dynamic sealing surface 28 along the valve face engaged by the valve rotor. Passages (not illustrated in FIG. 2) formed in the valve body and Teflon disc communicate with the various lines and the nozzle and cooperate with connecting passages (not illustrated) in the valve rotor so that as the valve rotor is progressively moved to its various operational positions, the required sequence of valve operation is performed. The valve rotor is provided with projecting arms 29 which are engaged by cams along the periphery of the circular path and operate to cause the valve rotor to be shifted progressively through various operating positions.

The valve rotor is journaled on the cantilever mounted shaft 24. Adjustment of the force of engagement between the face of the Teflon disc 27 and the mating face of the valve rotor is provided by a nut 31 threaded on to the outer end of the shaft 24. Spring means (not illustrated) acting between the nut 31 and the valve rotor 23 apply an adjustable spring bias force, urging the rotor against the disc 27.

Because the shaft 24 is cantilever mounted and provides the journal for the rotor and because the journaling surface between the shaft 24 and the rotor is relatively short, eccentric forces applied to the arms by the cams during the operation of the valve must be counteracted, at least in part, by the engagement between the valve rotor and the Teflon disc 27. This tends to reduce the pressure of engagement in an eccentric manner and tends to produce a leakage problem. Consequently, the force of engagement along the valve face must be adjusted to an excessive value. This tends to compound the difficulty since excessive pressure produces excessive friction which accentuates the forces required to shift the valve. Further, it tends to increase wear. Such valve has not been satisfactory for operation at elevated pressures.

Figure 3:
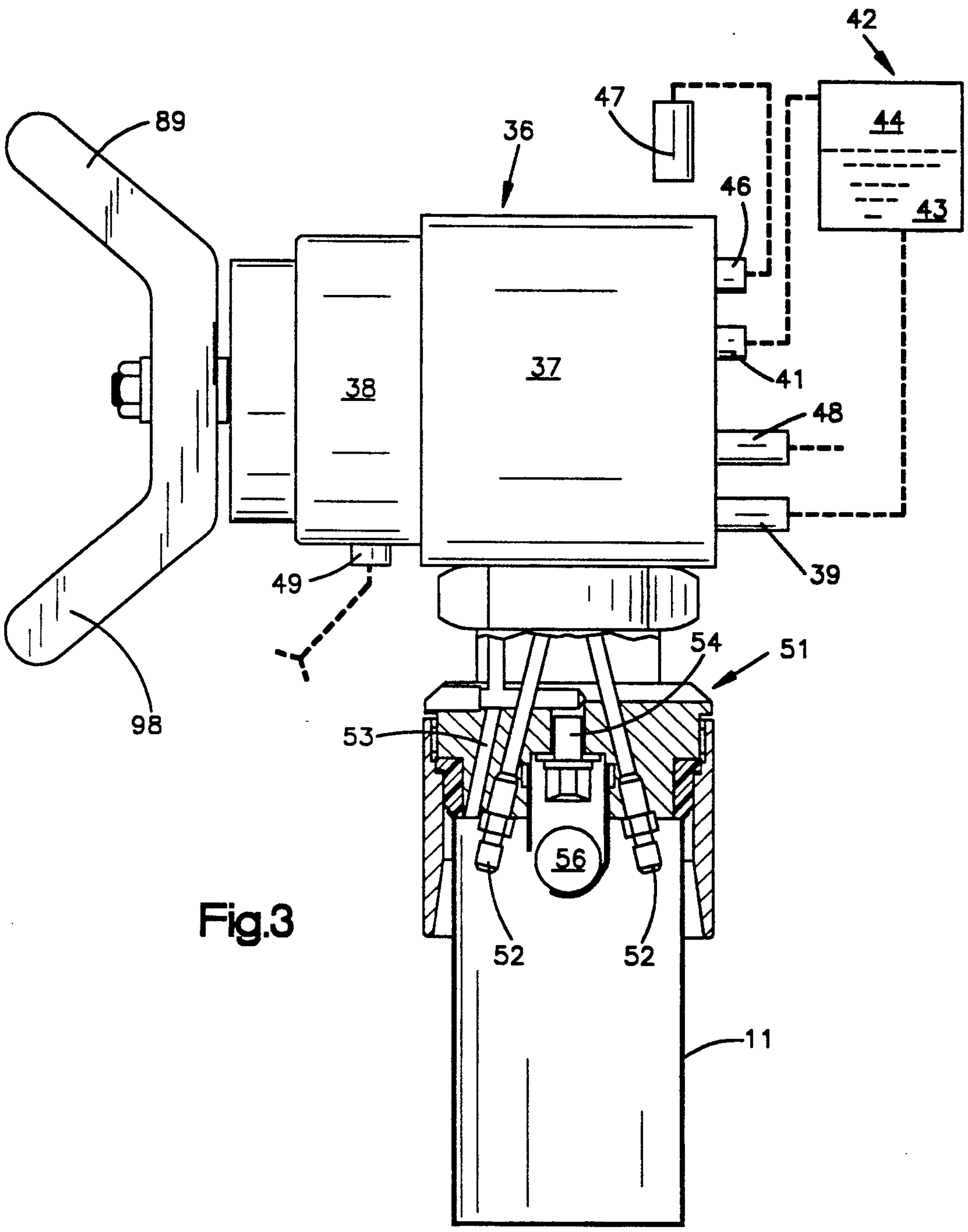
FIG. 3 schematically illustrates the valve, in accordance with the present invention, and its connection to a container providing the supply of beverage under pressure and its connection to a supply of pressurized compatible gas, such as carbon dioxide.

FIG. 3 schematically illustrates the installation of a valve, in accordance with the present invention, and its connection to the various sources of fluid which are controlled by the valve. The valve 36 has a body assembly, including a valve body 37 and a housing 38. Two pressure lines 39 and 41 connect with the rearward face of the valve body 37 and a pressurized container 42 which holds the supply of beer, or other carbonated beverage. The pressure line 39 connects with the lower portion 43 of the container and, therefore, connects with the beverage. The pressure line 41 connects with the upper gas filled portion 44 of the container.

The upper portion 44 of the chamber above the beverage contains gas under pressure. The pressure of the gas within the container 42 is maintained at a sufficiently high value to ensure that the carbonation of the beverage is maintained at the temperature of the beverage in the lower portion 43.

In the case of beer, maintained at substantially room temperature, this pressure is in the order of 80 PSI. On the other hand, if the container is refrigerated, the pressure maintained in the container can be substantially lower. A third passage 46 connects the valve to a supply 47 of compatible gas, such as carbon dioxide, in the case of a beer filling operation. Preferably, the pressure of the supply 47 of compatible gas is maintained a few PSI's higher than the pressure within the beverage supply container 42, such as, for example, 5 PSI.

The valve also provides a vent port 48 open to atmospheric pressure, and the housing 38 provides a housing drain line 49.

Mounted on the lower surface of the valve body is a nozzle assembly 51 which, in the illustrated embodiment, is operable to fill cans, such as beer cans 11. This nozzle assembly includes two nozzles 52 through which the beverage passes into the container during the filling operation. The nozzle also contains two passages 53 and 54 which connect to the upper zone of the container. A float valve 56 is spaced from the passage 54 during the filling operation, but floats up and closes the passage 54 when the container is properly filled.

Figure 4:
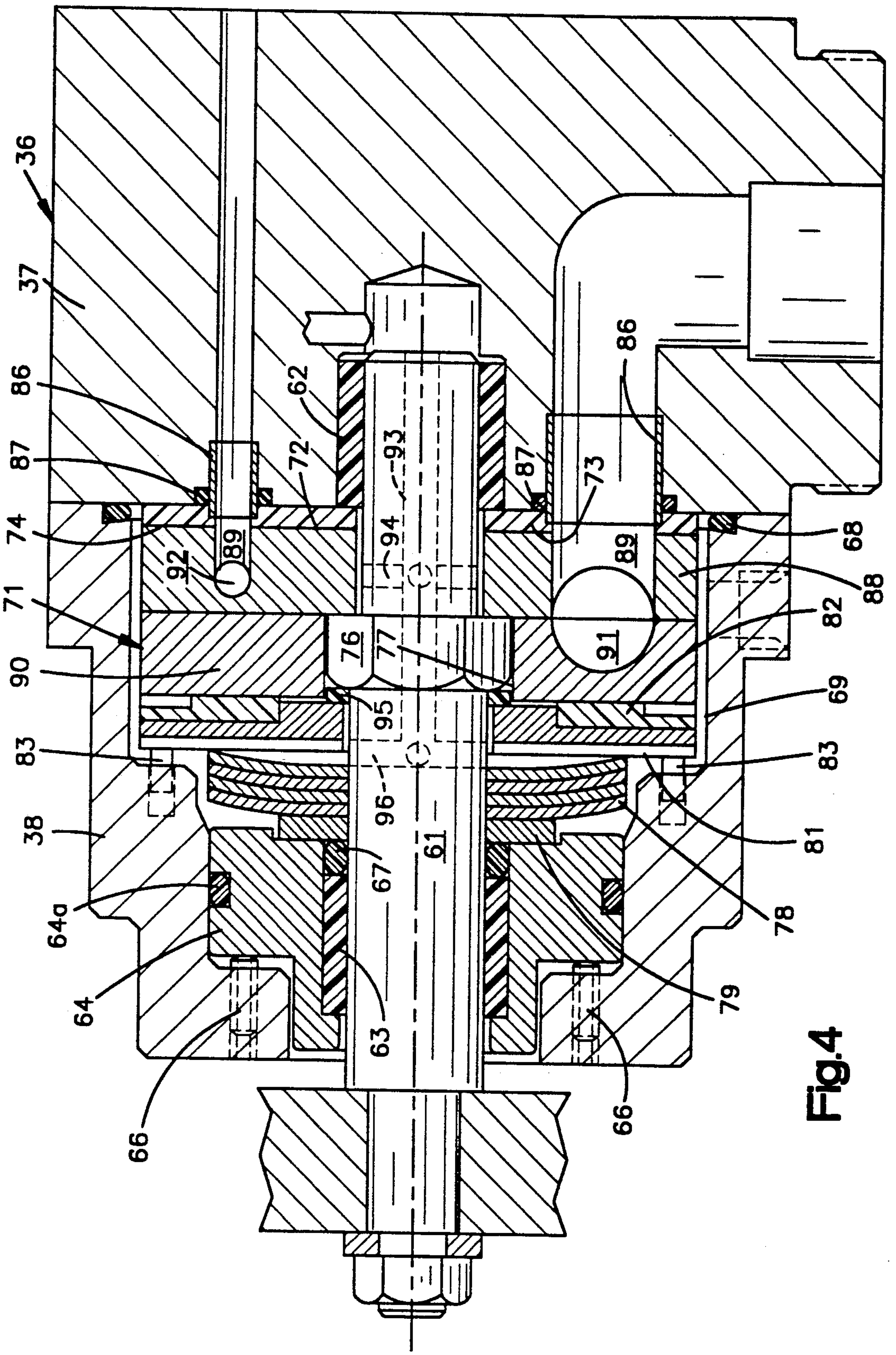
FIG. 4 is a cross-section of an assembled valve in accordance with the present invention illustrating the various component parts thereof.

Reference should now be made to FIG. 4, which illustrates the construction details of the valve 36, in accordance with the present invention. The valve provides an operating shaft 61 journaled at its inner end in a self-lubricating, non-metallic sleeve bearing 62 within the valve body 37. Adjacent its outer end, the operating shaft 61 is journaled in a similar self-lubricating sleeve bearing 63 mounted within a ring member 64 within the housing 38. The ring member position is adjustable in a direction aligned with the operating shaft 61 by a plurality of adjusting screws 66 threaded into the upper end of the housing 38. An O-ring type seal **64*a* provides a seal between the ring member 64 and the housing 38. Similarly, another O-ring seal 67 provides a seal between the shaft 61 and the ring member 64. These seals, in cooperation with a static O-ring type seal 68, cooperate to provide a leak-proof valve chamber 69 for preventing any leakage between the body 37 and the housing 38, as well as prevent any leakage between the housing 38 and the shaft 61**. Such seals operate reliably at all pressures encountered in the use of the valve.

Positioned within the chamber 69 is the valve rotor 71 providing a valving surface 72 engaging the surface of a non-metallic, low friction valve disc 73. The interface between the surface of the valve disc 73 and the valving surface 72 of the rotor is the dynamic valve face 74 of the valve. The operating shaft 61 is provided with a non-circular coupling portion 76 which fits into a mating coupling cavity 77 in the valve rotor, so that the operating shaft 61 and the valve rotor 71 are mechanically connected for co-rotation. In the illustrated embodiment, the coupling portion 76 and the coupling cavity 77 are hexagonal.

Spring pressure is applied to the rotor, urging it in a direction toward the valve disc 73 with a force which is adjustable. The spring system includes a plurality of belleville type springs 78 which extend between a thrust washer 79 and a second thrust washer 81. The thrust washer 79 extends between the ring member 64, and the outer side of the springs 78. The thrust washer 81 extends between the springs 78 and a thrust bearing 82. Pins 83 prevent relative rotation between the housing 38 and the thrust washer 81 while allowing limited axial movement therebetween. Therefore, the springs 78, the two thrust washers 79 and 81, along with the ring member 64 are held against rotation with the shaft 61. Relatively low friction, relative rotation between the rotor 71 and the thrust washer 81 is provided by the thrust bearing 82.

The magnitude of the resilient force urging the valve rotor against the valve disc is adjusted by the screws 66, which in turn, adjust the axial position of the ring member 64 within the housing and adjustably determine the spring force applied to the rotor 71 by the springs 78.

In order to prevent any leakage between the valve disc 73 and the adjacent surface of the valve body 37, a sleeve 86 is positioned in each passage within the valve body 37 which is open to the valve face. Each of these sleeves projects along a passage within the valve body and into the valve disc 73 a short distance. In addition, an O-ring seal 87 is positioned around each of the sleeves engaging the sleeve, the adjacent surface of the valve disc 73, and the adjacent surface of the valve body to ensure that leakage cannot occur between any of these three elements. The sleeves, because they extend into the valve disc a short distance, also ensure that the valve disc is held against rotation relative to the body and remains in its proper orientation.

Because of the sealing characteristics of the valve disc, a fluid unbalanced condition exists, tending to urge each of the sleeves toward the valve disc with a force which is a function of the pressure in the associated passage.

In the illustrated embodiment, the valve disc is produced in two parts to simplify the machining operations. The inner disc member 88 contains the valve ports 89 of the valve rotor. In most instances, the cross connections between the associated valve ports are provided at the interface between the inner disc member 88 and the outer disc member 90. These connecting passages 91 are preferably formed at such interface by use of a ball mill, which cuts a semi-circular passage between associated ports. After the two disc members 88 and 90 are fully machined, they are permanently connected together by a full brazed connection, such as obtainable by nickel brazing. By forming the passages 91 in this manner, it is not necessary to perform a substantial number of cross boreing operations requiring plugging of the ends of the bore. However, in one instance, a connecting passage 92 is inwardly spaced from the interface between the two disc members 88 and 90, since it must bypass and be isolated from other connecting passages. In this case, the passage 92 is formed by the usual boreing and plugging operation.

As mentioned previously, the valve and the associated passages must be fully cleaned with a relatively high temperature cleaning solution. In order to ensure that the valve interior is fully clean, the operating shaft 61 is provided with an axial passage 93, which connects with two lateral passages 94 and 96 through which cleaning solution is introduced into the valve chamber 69 on both sides of the coupling portion 76. This passage is also preferably open to the passage 46 from the supply of inert gas, so as to ensure that the chamber 69 is maintained at such pressure during the operation of the valve.

Sufficient clearance is provided between the coupling portion 76 and the cavity 77, and also between the portion of the shaft extending through the inner disc member 88 so that the disc member is free to tip a small amount with respect to the shaft. This ensures that uniform engagement will be provided along the valve interface and prevents any misalignment between the shaft and the rotor from producing an irregular pressure pattern across such interface.

Since the pressure forces on the shaft 61 are unbalanced, a small thrust washer 95 is provided between the outer surface of the coupling portion 76 and the thrust washer 81, as illustrated in FIG. 3. Mounted on the outer, or projecting end of the shaft, are the arms 98 which engage the cams 18 and cause operation of the valves as each valve moves around the circular path 13.

With this valve structure, the differential pressure between the cavity 69 and the ports containing the beverage is preferably maintained at a low value, such as 5 PSI. This is accomplished by maintaining the pressure in the supply of compatible gas 47 at pressure higher than the pressure in the beverage container 42 by a small amount, such as 5 PSI. Since the pressure differential across the valve face is maintained at a relatively low value, high forces of engagement at the valve face are not required, even when the total pressure of the fluid being valved is relatively high, for example, 80 PSI or more. Further, since the pressure in the chamber 69 is preferably maintained at a higher pressure than the pressure of the beverage, any leakage which might occur will involve leakage of the compatible gas into the ports containing the beverage.

It should be recognized, however, that even if the chamber 69 is maintained at a pressure somewhat below the pressure of the beverage, leakage does not occur because the differential pressure is small. Further, if any leakage occurs for any reason, it is contained within the chamber 69 and does not contaminate adjacent portions of the machine. Instead, it is easily drained away through the drain line 49 in the housing 38.

In practice, it has been found that the pressure on the valve rotor required to establish sufficient friction to ensure that the rotor does not overtravel after engaging the operating cams, is higher than the force that would be required to ensure substantially zero leakage. Further, this force need not be changed any substantial amount when the valve operates at higher or lower pressures since the force of engagement along the valve face required to prevent leakage is quite small due to the low pressure differential involved.

Reference should now be made to FIGS. 5–8 which illustrate the valve in the positions it must move through progressively during each full cycle of operation. In each of these FIGS., the ports in the valve disc 73 and the surrounding associated O-rings are illustrated in concentric circles. The ports and passages in the rotor are illustrated by dotted lines.

Figure 5:
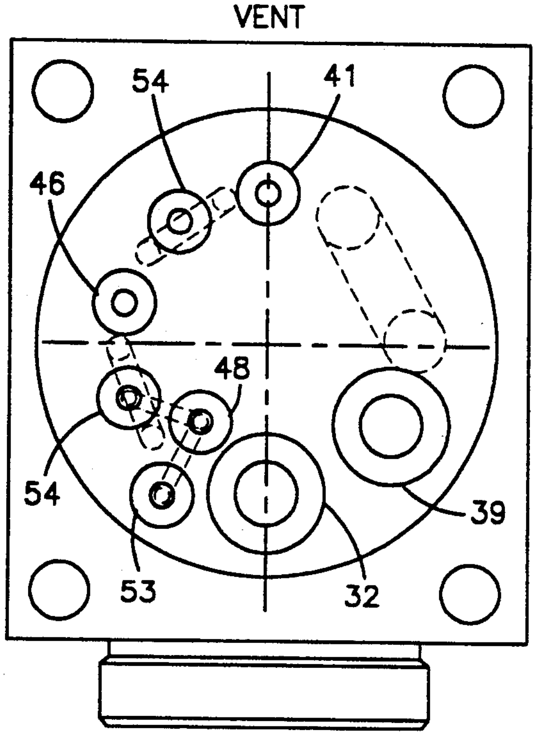
FIG. 5 schematically illustrates the valve in a first position in which the valve and a previously filled container are vented to atmosphere so that the filled container can be released from the valve and promptly closed with a suitable cap, or closure system.

FIG. 5 illustrates the rotor in the venting position in which the vent passage 48 is connected to the passages 54 and 53 which, in turn, are open to the interior of the filled container above and below the float valve 56 respectively. This is the position of the valve at the end of the fill cycle in which the filled container is vented to atmosphere and released from the nozzle assembly. Immediately thereafter, the container is closed. In this valve position, all of the remaining ports are closed so that both portions of the beverage container are isolated from the nozzle. Similarly, the supply of compatible gas is isolated, excepting for the connection thereof with the valve chamber 69.

Figure 6:
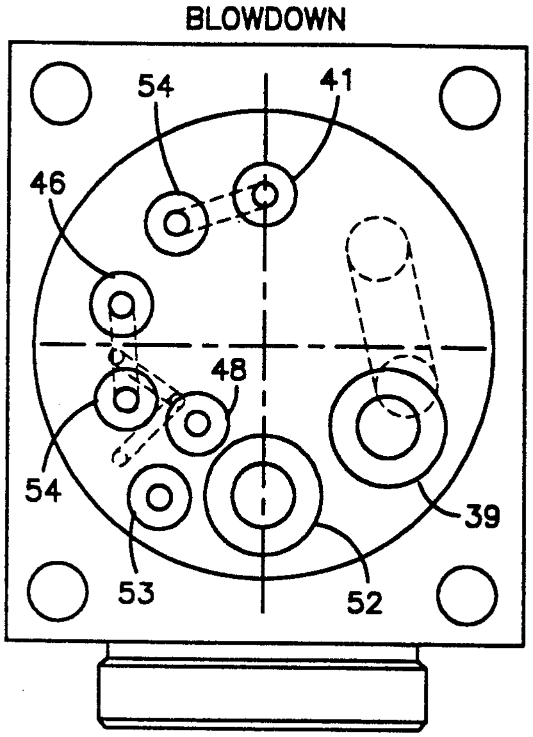
FIG. 6 is a schematic view similar to FIG. 5 illustrating the valve in a purge, or blow-down position, in which a compatible gas is used to purge any beverage remaining from the previous filling cycle.

The next position to which the valve is progressively moved is illustrated in FIG. 6. This is the purge, or blow-out position, in which the passage 46 is connected to the passage 54 and also through the passage 54 to the passage 41. The remaining passages are closed in this position. In this position, the various passages are blown out to ensure that any beverage which might have entered the passages are cleared therefrom.

Figure 7:
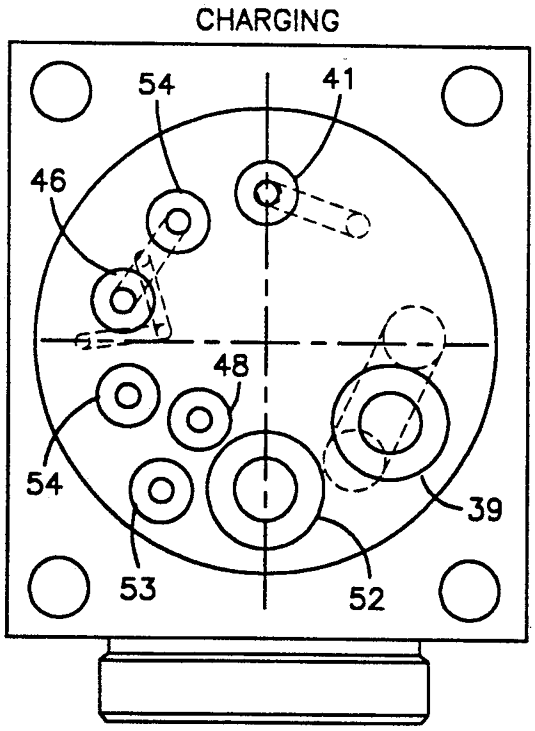
FIG. 7 is a view similar to FIGS. 5 and 6, but illustrating a valve in a charge position in which the empty container is charged with a compatible gas, such as carbon dioxide.

The valve is then shifted to the position illustrated in FIG. 7 in which the passage 46, from the source of compatible gas, is connected to the passage 54. At this time in the cycle of operation, an associated container is positioned at the associated nozzle, and a seal is formed therewith. In this position, therefore, the container is pressurized with the compatible gas (carbon dioxide in the case of beer). In such position, all of the other ports are closed. If an associated container is not properly located and properly sealed in this position of the valve, the pressure in the container does not build up, and the controls of the machine are operated so as to prevent movement of the valve to the fill position by retracting associated cams from the path of that valve. Consequently, an automatic test is performed to determine the proper positioning of a container and sealing with the nozzle at this point in the operation of the machine. In the position of FIG. 7, both of the lines 39 and 41 connecting with the two zones of the beverage container 42 are closed.

Figure 8:
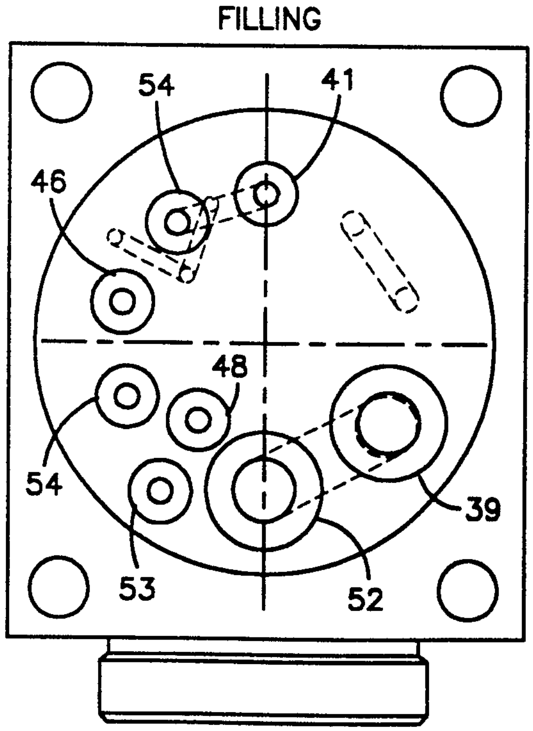
FIG. 8 is a schematic view similar to FIGS. 5–7 illustrating the valve in the fill position in which the beverage flows from the beverage source into the container for filling.

The valve is then operated to the position of FIG. 8, in which the container is filled. In such position, the two nozzles 52 are connected to the line 39, and the passage 54 is connected to the line 41. Therefore, the upper portion of the container is connected to the zone 44 within the beverage container 42 above the beverage. Therefore, the container is at the same pressure as the supply of beverage. Also, the nozzles 52 are connected to the line 39 so that a beverage may flow by gravity into the container. This continues until the container is filled. When the container is properly filled, the float valve 56 floats up and closes off the passage 54. This has the effect of terminating further flow of beverage into the container.

At the completion of the filling operation, the valve is returned to the vent position of FIG. 5, and the full cycle of operation has been completed.

Since the valve must be capable of operation without any contamination of the beverage, all of the bearing and seal parts are formed of low friction material which is capable of operating without lubrication. Such material is preferably a filled Teflon material, which is wear resistant and is not subject to damage, even under the relatively high temperatures encountered during the flushing or cleaning operation. Further, there is substantially no relative movement between engaging metal parts, so the likelihood of metal contamination is eliminated. Still further, the metallic parts of the valve are preferably formed of stainless steel, which does not present a corrosion problem in the environment encountered.

With this valve, reliable sealing is obtained, even at pressures encountered when the supply of the beverage is maintained at room temperature. Therefore, the necessity of chilling the beverage is eliminated. Further, since the beverage is at room temperature, the amount of heating required for pasteurizing is reduced. Further, because the differential pressure across the valve face is low, proper sealing is achieved even when the pressure along the valve face is relatively low. Still further, because the valve chamber is completely closed, any leakage which might exist is contained to prevent contamination of the adjacent portions of the machine.

Although the preferred embodiments of this invention have been shown and described, it should be understood that various modifications and rearrangements of the parts may be resorted to without departing from the scope of the invention as disclosed and claimed herein.

What is claimed is:

1. A rotary face valve operable to a plurality of operative positions, comprising a body assembly having supply passages, sleeves and a disc, said disc being formed of a non-metallic low friction material operable without lubrication, said disc providing a planar valve face having a valve ports therein connected to said passages, said sleeves extending from said passages into said disc at said ports to form a seal therebetween and to prevent rotation of said disc with respect to said body, a housing assembly mounted on said body assembly cooperating therewith to define a valve chamber, a valve rotor journaled for rotation in said chamber and having a valve surface engaging with said valve face, means for sealingly forcing said rotor against said disc along a valving interface therebetween, said rotor having connecting ports operable in selected positions of said rotor to interconnect selected valve ports, said rotor supported in said chamber by a shaft, said shaft extending from said chamber, through said rotor and into said body assembly and being journaled in spaced bearings with one bearing on each side of said rotor, at least one of said valve ports in said body assembly adapted to contain a supply of liquid fluid under a predetermined pressure, and means communicating with said chamber for maintaining said chamber at a pressure higher than said predetermined pressure so that the pressure differential along said valving interface is substantially below said predetermined pressure.

2. A rotary face valve as set forth in claim 1, wherein connecting means connects said shaft and rotor for co-rotation while permitting limited freedom to ensure that said rotor properly seats against said valve face.

3. A rotary face valve as set forth in claim 2, wherein a first of said spaced bearings is mounted in said body assembly, and another of said spaced bearings is mounted in said housing assembly.

4. A rotary face valve as set forth in claim 3, wherein arms are provided on said shaft, said arms operating to rotate said shaft when eccentric forces are applied thereto, said spaced bearings absorbing said eccentric forces and isolating said eccentric forces from said rotor.

* * * * *